(12) United States Patent
Jiang et al.

(10) Patent No.: US 12,609,390 B2
(45) Date of Patent: Apr. 21, 2026

(54) BATTERY PACK, VEHICLE AND ENERGY STORAGE DEVICE

(71) Applicant: BYD COMPANY LIMITED, Shenzhen (CN)

(72) Inventors: Xi Jiang, Shenzhen (CN); Yi Pan, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 729 days.

(21) Appl. No.: 17/991,674

(22) Filed: Nov. 21, 2022

(65) Prior Publication Data

US 2023/0087960 A1      Mar. 23, 2023

Related U.S. Application Data

(63) Continuation of application No. PCT/CN2021/095533, filed on May 24, 2021.

(30) Foreign Application Priority Data

May 25, 2020     (CN) .......................... 202010447938.3

(51) Int. Cl.
H01M 50/242        (2021.01)
B60L 50/64         (2019.01)
B60L 58/12         (2019.01)
H01M 10/04         (2006.01)
(Continued)

(52) U.S. Cl.
CPC ........... H01M 50/242 (2021.01); B60L 50/64 (2019.02); B60L 58/12 (2019.02); H01M 10/0481 (2013.01); H01M 50/209 (2021.01); H01M 50/249 (2021.01); H01M 2220/20 (2013.01)

(58) Field of Classification Search
None
See application file for complete search history.

(56) References Cited

U.S. PATENT DOCUMENTS

| | | | |
|---|---|---|---|
| 2004/0058233 A1 | 3/2004 | Hamada et al. | |
| 2018/0151856 A1 | 5/2018 | Fischer et al. | |
| 2023/0079318 A1* | 3/2023 | Sun ..................... | H01M 50/289 |
| | | | 429/156 |

FOREIGN PATENT DOCUMENTS

| | | |
|---|---|---|
| CN | 209217069 U | 8/2019 |
| CN | 110265591 A | 9/2019 |
| CN | 209658292 U | 11/2019 |

(Continued)

OTHER PUBLICATIONS

International Search Report and Written Opinion for Application No. PCT/CN2021/095533, mailed on Sep. 1, 2021, 10 pages.

*Primary Examiner* — Gregg Cantelmo
(74) *Attorney, Agent, or Firm* — Sheppard Mullin Richter & Hampton LLP

(57)        ABSTRACT

A battery pack, a vehicle and an energy storage device. The battery pack includes at least one battery sequence. The battery sequence includes a plurality of batteries. At least one of the batteries includes a casing and a core packaged in the casing. A gap exists between two neighboring batteries. A ratio of the gap to the thickness of the battery is c, and c satisfies the following relational expression: $(a-b)<c<(a\times t)$, where a represents an expansion rate of the battery; b represents a compression rate of the core; and t represents a ratio in percentage of a thickness of the battery after effective compression to a thickness of the battery before compression.

20 Claims, 3 Drawing Sheets

(51) Int. Cl.
    *H01M 50/209*     (2021.01)
    *H01M 50/249*     (2021.01)

(56)           References Cited

FOREIGN PATENT DOCUMENTS

| | | | |
|---|---|---|---|
| CN | 110828717 A | 2/2020 | |
| CN | 110828744 A | 2/2020 | |
| CN | 110828745 A | 2/2020 | |
| CN | 110828746 A | 2/2020 | |
| CN | 111354899 A | 6/2020 | |
| EP | 599137 A1 * | 6/1994 | |
| EP | 3993117 A1 | 5/2022 | |
| EP | 3996176 A1 | 5/2022 | |
| JP | 2012146588 A | 8/2012 | |
| JP | 2015011919 A | 1/2015 | |
| JP | 2015220218 A | 12/2015 | |
| WO | WO-2020042411 A1 * | 3/2020 | .......... H01M 10/653 |

* cited by examiner

BATTERY PACK, VEHICLE AND ENERGY STORAGE DEVICE

CROSS-REFERENCE TO RELATED APPLICATIONS

The application is a continuation application of International Patent Application No. PCT/CN2021/095533 filed with the China National Intellectual Property Administration (CNIPA) on May 24, 2021, which is based on and claims priority to and benefits of Chinese Patent Application No. 202010447938.3, filed on May 25, 2020. The entire content of the above-referenced applications is incorporated herein by reference.

FIELD

This application relates to the field of battery technologies, and particularly to a battery pack, a vehicle and an energy storage device.

BACKGROUND

As the energy density of battery packs for electric vehicles is increasing, long service life is one of the difficulties that need to be overcome, which is also a very important indicator that affects user experience, and is a goal that various battery companies and new energy automobile companies have been pursuing. In a battery pack, the electrochemical system affects the service life of the battery. In addition, the external environment also has a crucial impact on the service life of the battery. Among others, the battery may expand during the cycle, and neighboring batteries squeeze each other after expansion, resulting in deterioration of battery performance, or even leading to safety issues in severe cases.

In the related art, in order to alleviate battery expansion, most of current researches focus on reserving a certain gap between neighboring batteries in the battery pack/battery module. However, the gap occupies the internal space of the battery pack. If the number of batteries in the battery pack is relatively large, the gap reserved is too large, and a gap needs to be reserved between every two neighboring batteries, the space utilization of the battery pack will inevitably be significantly reduced. However, if the gap reserved is too small, the battery expansion cannot be effectively alleviated. Therefore, how to reasonably design the gap between neighboring batteries to alleviate battery expansion without occupying too much internal space of the battery pack so as to maximize the overall performance of the battery pack is an urgent problem to be solved at present.

SUMMARY

In order to solve at least one of the above-mentioned problems, this application is to provide a battery pack, which not only can alleviate battery expansion and prolong the cycle life of the battery, but also makes full use of the internal space of the battery pack.

According to a first aspect of this application, a battery pack is provided, including at least one battery sequence, where the battery sequence includes a plurality of batteries; a thickness of each battery extends along a first direction, and the plurality of batteries are arranged along the first direction to form the battery sequence; and the batteries each include a casing and a core packaged in the casing, a gap exists between at least two neighboring batteries, a ratio of the gap to the thickness of the battery is c, and c satisfies the following relational expression: $(a-b)<c<(a\times t)$, where a represents an expansion rate of the battery;

b represents a compression rate of the core; and t represents a ratio in percentage of a thickness of the battery after effective compression to a thickness of the battery before compression.

In some implementations of this application, a represents an expansion rate of the battery in the first direction, and b represents a compression rate of the core in the first direction.

In some implementations of this application, a=(thickness of the battery after expansion−thickness of the battery before expansion)/thickness of the battery before expansion×100%, b=(thickness of the core before compression−thickness of the core after compression)/thickness of the core before compression×100%, and t=thickness of the battery after effective compression/thickness of the battery before compression×100%.

In some implementations of this application, the thickness of the battery before expansion is an initial thickness of the battery before use, and the thickness of the battery after expansion is a thickness measured when a capacity of the battery decreases to 80% or less of an initial capacity.

In some implementations of this application, the casing includes a casing body having an opening and a cover plate, the cover plate is connected to the opening of the casing body to jointly define a sealed accommodating cavity, and the core is located inside the accommodating cavity;

the thickness of the battery before expansion is a dimension of the cover plate along the first direction; and the thickness of the battery after expansion is a spacing between two imaginary parallel planes sandwiching the battery along the first direction.

In some implementations of this application, b represents a critical compression rate of the core in the first direction, and the thickness of the core after compression is a critical thickness of the core before being damaged by compression.

In some implementations of this application, the thickness of the battery after effective compression is greater than the critical thickness of the core after compression.

In some implementations of this application, the thickness of the core before compression is an initial thickness of the core before use; and the thickness of the core after compression is an average distance between two opposite surfaces of the core along the first direction after compression.

In some implementations of this application, the thickness of the core after compression is a thickness of the core measured after a pressure $P_1$ has been applied to the core for a predetermined time.

In some implementations of this application, the pressure is applied to an outer surface of the core along the first direction, $P_1$=0.5 Mpa-0.7 MPa, and the predetermined time $T_1$=60 s-180 s.

In some implementations of this application, a=(thickness of the battery after expansion−thickness of the battery before expansion)/thickness of the battery before expansion×100%, b=(initial thickness of the battery before use−thickness of the core after compression)/initial thickness of the battery before use×100%, and t=thickness of the battery after effective compression/thickness of the battery before compression×100%.

In some implementations of this application, the thickness of the battery before compression is a thickness measured when a DC internal resistance of the battery is $r_1$ before compression, and the thickness of the battery after effective compression is a thickness measured when a pressure $P_2$ is applied to the battery and the DC internal resistance of the battery is $r_2$, where $r_1$ and $r_2$ satisfy: $(r_1-r_2)/r_1 \times 100\% = 2\%-8\%$.

In some implementations of this application, the pressure $P_2$ is applied to an outer surface of the battery along the first direction.

In some implementations of this application, the thickness of the battery before compression is a thickness measured before compression when the battery is at a state of charge (SOC) of 20%-80%; and the thickness of the battery after effective compression is a thickness measured after compression when the battery is at a state of charge (SOC) of 20%-80%.

In some implementations of this application, the gap between two neighboring batteries is a gap between the two neighboring batteries before use; and the thickness of the battery is an initial thickness of the battery before use.

In some implementations of this application, the casing includes a casing body having an opening and a cover plate, the cover plate is connected to the opening of the casing body to jointly define a sealed accommodating cavity, and the core is located inside the accommodating cavity;

and the gap between two neighboring batteries includes a first gap, the first gap is a minimum distance between two cover plates, which are located on the same side, of the two neighboring batteries, and the thickness of the battery is a dimension of the cover plate along the first direction.

In some implementations of this application, the casing includes a casing body having an opening and a cover plate, the cover plate is connected to the opening of the casing body to jointly define a sealed accommodating cavity, and the core is located inside the accommodating cavity;

the battery has two opposite first surfaces along the first direction;

the gap between two neighboring batteries includes a second gap, and the second gap is a minimum spacing between two first surfaces, which are opposite to each other, of the two neighboring batteries; and the thickness of the battery is a dimension of the cover plate along the first direction.

In some implementations of this application, a second gap of the battery before use is greater than a second gap of the battery after use.

In some implementations of this application, a has a value in the range of 5.8%-17.5%, b has a value in the range of 3.21%-8.8%, and t has a value in the range of 81%-97%.

In some implementations of this application, a length of the battery extends along the second direction, and the length of the battery is 400-2500 mm; and the second direction is different from the first direction.

In some implementations of this application, a plurality of cores are packaged in the casing, the plurality of cores are divided into several core groups, and the core groups are connected in series.

In some implementations of this application, a packaging film is further disposed between the casing and the core, and the core is packaged in the packaging film.

According to a second aspect of this application, a vehicle is provided, including the above battery pack.

According to a third aspect of this application, an energy storage device is provided, including the above battery pack.

By means of the above technical solutions, the beneficial effects obtained in this application are as follows: When a gap is reserved between neighboring batteries to provide a buffer space for battery expansion, multiple factors such as the expansion rate of the battery, the compression rate of the core and the compressed thickness effective for the battery performance are comprehensively considered. By taking into consideration the above factors, the design of the gap between the batteries will be more scientific and reasonable. The reservation of the gap according to the above relational expressions can prevent the gap between batteries from being too large to waste the space of the battery pack and from being too small to fail in providing a buffering effect. As such, the service life of the battery pack can be prolonged while improving the space utilization of the battery pack.

LIST OF REFERENCE NUMERALS

Figures 1, 2:
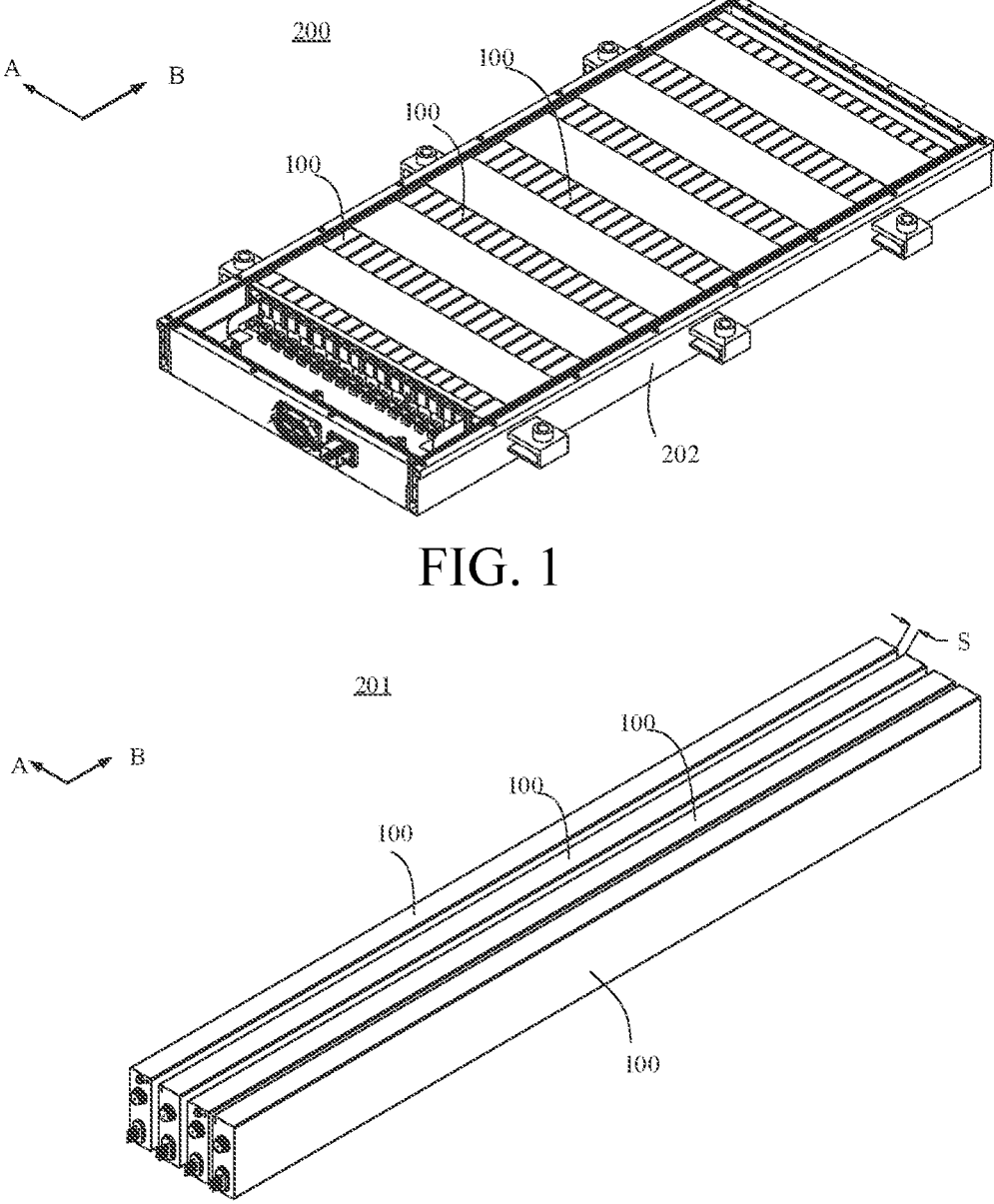
FIG. 1 is a schematic diagram of a battery pack according to this application.
FIG. 2 is a schematic diagram of a battery sequence according to this application.

200, battery pack; 201, battery sequence; 202, tray;
300, battery module; 400, vehicle; 500, energy storage device;
100, battery; 101, casing; 1011, cover plate; 1012, casing body; 102, core; 1021, positive tab; 1022, negative tab.

DETAILED DESCRIPTION

This application provides a battery pack 200. The battery pack 200 includes at least one battery sequence 201. The battery sequence 201 includes a plurality of batteries 100. A thickness of each battery 100 extends along a first direction (where in the figures, A represents the first direction and B represents a second direction). The plurality of batteries 100 are successively arranged along the first direction to form the battery sequence 201. The batteries 100 each may include a casing 101 and a core 102 packaged in the casing 101. A gap exists between at least two neighboring batteries 100. A ratio of the gap to the thickness of the battery 100 is c, and c satisfies the following relational expression: $(a-b) < c < (a \times t)$, where a represents an expansion rate of the battery 100; b represents a compression rate of the core 102; and t represents a ratio in percentage of a thickness of the battery 100 after effective compression to a thickness of the battery 100 before compression.

In this application, the battery pack 200 may include one or more battery sequences 201. When a plurality of battery sequences 201 are included, the plurality of battery sequences 201 are connected in series and/or parallel to form the battery pack 200. Each battery sequence 201 includes two or more batteries 100. In actual production, the number of batteries 100 and the number of battery sequences 201 can be set according to actual needs, which is not limited in this application.

That the thickness of each battery 100 extends along the first direction and the plurality of batteries 100 are successively arranged along the first direction can be understood as: in at least one battery sequence 201, a plurality of batteries 100 are arranged along the thickness direction thereof, and two opposite surfaces of the battery 100 in the thickness direction have the largest area. The arrangement of the batteries 100 along the thickness direction means that the batteries 100 are successively arranged with large surfaces thereof facing toward each other. Because the surface with a larger area is more likely to expand, a certain gap reserved between the batteries 100 can provide a buffer space for the expansion of the batteries 100.

When the battery 100 expands, heat is generated. When a certain gap is reserved between the batteries 100, the gap can also serve as a heat dissipation channel, such as an air duct. The larger surface of the battery 100 has a better heat dissipation effect, which can improve the heat dissipation efficiency of the battery pack 200 or the battery module 300, thereby improving the safety performance of the battery pack 200.

In the above solution, the reservation of the gap between two neighboring batteries 100 can be understood as that no mechanical member is disposed between the batteries 100 and only a certain space is reserved, or can be understood as that another mechanical member is disposed between two neighboring batteries 100 so that one battery 100 is separated from the other battery 100 by the mechanical member.

It should be noted that when a mechanical member is disposed between two neighboring batteries 100, the gap between the batteries 100 should be understood as a distance between the batteries 100 on two sides of the mechanical member, rather than a spacing between the mechanical member and the battery 100.

It should be noted that a mechanical member may be spaced apart from the batteries 100 on two sides of the mechanical member by a certain gap or may be in direct contact with the batteries 100. When the mechanical member is in direct contact with the batteries 100 on the two sides thereof, the mechanical member should have a certain degree of flexibility, which can provide a buffering effect for expansion of the batteries 100.

The mechanical member includes but is not limited to aerogel, a thermally conductive structural adhesive or a heat insulation foam.

In this application, when the battery pack 200 includes a plurality of battery sequences 201, the gap between two neighboring batteries should refer to a spacing between two neighboring batteries 100 in the same battery sequence 201, rather than a spacing between two neighboring batteries 100 from two different battery sequences 201. Of course, the gap between two neighboring batteries 100 from different battery sequences 201 can also be set with reference to the above relational expressions, which is not limited in this application.

In the same battery sequence 201, a certain gap may be reserved between every two neighboring batteries 100, or a certain gap may be reserved between some of the neighboring batteries 100.

It should be noted that the gap between two neighboring batteries 100 changes with the increase of the operating time of the batteries 100, but whether in operation, after operation or before the batteries 100 leave the factory, all technical solutions where the gap between two neighboring batteries 100 satisfies the above relational expression shall fall within the protection scope of this application.

In this application, the battery 100 may be an all-solid-state battery or a gel polymer battery, and may be a liquid battery, a soft pack battery, or a square battery. The core 102 includes an electrode assembly formed by successively winding or stacking a positive electrode plate, a solid electrolyte layer and a negative electrode, or the core 102 includes a battery assembly formed by successively winding or stacking a positive electrode plate, a separator, and a negative electrode (where the core 102 further includes an electrolyte).

The expansion of the battery 100 is related to the thickness of the battery 100. The greater the thickness of the battery 100, the more likely the battery 100 is to expand. Therefore, the thickness of the battery 100 should be considered in the process of setting the gap between two neighboring batteries 100.

During the aging process of the battery 100, as the capacity of the battery 100 decreases, the thickness of core 102 inside the casing 101 of the battery 100 gradually increases, and the battery 100 expands. The expansion performance of the battery 100 varies with different electrochemical systems. The expansion rate a of the battery 100 characterizes the expansion performance of the battery 100. The larger the parameter a, the more likely the battery 100 is to expand; the smaller the parameter a, the less likely the battery 100 is to expand. The expansion performance a of the battery 100 directly affects the service life of the battery 100, so the expansion performance of the battery 100 needs to be fully considered in the process of setting the gap between two neighboring batteries 100.

When the battery 100 expands, the free expansion of the core 102 located inside the casing 101 is restricted to a certain extent. Due to the restriction by the casing 101, the core 102 is compressed in the expansion direction thereof. The compressibility of the core 102 varies with different electrochemical systems. The compression rate b of the core 102 characterizes the compressibility of the core 102. The service life of the battery core is directly related to the degree to which the core 102 can be compressed. If the value of b is too small, the core 102 will be over-compressed, which accelerates the shortening of the service life of the battery 100. A desirable value of b is conducive to ensuring the normal electrochemical life of the battery 100. Therefore, in the process of setting the reserved gap, it is necessary to comprehensively consider the influence of the compressibility of the core 102.

Once the battery 100 expands, gaps are formed between the positive electrode plate, the negative electrode plate and the separator inside the battery 100. As a result, the positive electrode plate, the negative electrode plate and the separator are no longer closely attached to each other, which increases the mass transfer resistance of lithium ions and is not conducive to the lithium ions. Therefore, the moderate squeezing between two neighboring batteries 100 has a shaping effect on the interface within the battery 100, which can ensure the close adhesion between the positive electrode plate, the separator and the negative electrode plate, reduce the mass transfer resistance of lithium ions, increase the transfer rate of lithium ions, promote the internal dynamics of the battery 100, and prolong the service life of the battery 100. The parameter t characterizes the effect of the expansion stress of the battery 100 in prolonging the service life of the battery 100. It should be noted that the thickness of the battery after effective compression may be a thickness of the battery when the battery is compressed to a maximum allowed compression amount while maintaining optimal performance of the battery.

The inventors of this application have found through experiments that when $c \leq (a-b)$, the capacity of the battery 100 tends to decrease at a faster rate along with the cycles.

When $c > a \times t$, the capacity of the battery 100 decreases at a faster rate along with the cycles, accompanied by the phenomenon of gas bulging.

The inventors of this application have found through experiments by comprehensively considering the above factors that when the ratio c of the gap between two neighboring batteries 100 to the thickness of the battery 100 is limited to the above range, i.e., $(a-b) < c < (a \times t)$, the gap reserved between the batteries 100 can meet the requirements for free expansion of the battery 100. This not only prevents overcompression of neighboring batteries 100 to cause uneven stress on the casing 101 of the battery 100 and result in the occurrence of phenomena such as lithium plating and sharp drop of the capacity of the battery 100 and prolongs the cycle life of the battery 100; but also prevents the gap reserved between the batteries 100 from being too large to waste the arrangement space in the batteries 100 and reduce the volume utilization of the battery pack 200. In addition, the setting of the gap can also provide a moderate compression space between neighboring batteries 100, to ensure that the internal interface of the core 102 is more closely attached, enhance the lithium ion mass transfer capacity of the battery 100, and improve the overall performance of the battery 100.

Once the battery 100 expands, the volume of the battery 100 expand simultaneously in various directions such as the length, width, and thickness directions of the battery 100. The expansion rates and compression rates of the battery 100 and the core 102 in the directions are different. However, the expansion rates or compression rates of the battery 100 and the core 102, whether in the length direction, in the thickness direction or in the width direction, shall all fall within the scope of protection of this application as long as they satisfy the relational expressions provided in this application.

The two opposite surfaces of the battery 100 in the thickness direction have a larger area, and therefore experiences more significant expansion or shrinkage. Therefore, in an implementation of this application, a represents an expansion rate of the battery 100 in the first direction; and correspondingly, b represents a compression rate of the core 102 in the first direction, the thickness direction of the battery 100 is parallel to the first direction, and the thickness direction of the core 102 is parallel to the first direction.

In some implementations of this application, a formula for calculating the expansion rate of the battery 100 in the first direction is:

a=(thickness of the battery 100 after expansion−thickness of the battery 100 before expansion)/thickness of the battery 100 before expansion×100%;

a formula for calculating the compression rate of the core 102 in the first direction is:

b=(thickness of the core 102 before compression−thickness of the core 102 after compression)/thickness of the core 102 before compression×100%;

a formula for calculating the ratio of the gap between two neighboring batteries 100 to the thickness of the battery 100 before expansion is:

c=gap between two neighboring batteries 100/initial thickness of the battery 100 before use; and a formula for calculating t is:

and t=thickness of the battery 100 after effective compression/thickness of the battery 100 before compression×100%.

In the above solution, the thickness of the battery 100 before expansion can be understood as the initial thickness of the battery 100 before use, and the thickness of the battery 100 after expansion can be understood as a thickness of the battery 100 after use.

"Before use" can be understood as that the battery 100 is waiting to leave the factory after the assembly is completed or has left the factory but has not yet begun to provide power to the outside. "After use" can be understood as that the battery 100 has provided power to the outside. For example, if the battery pack 200 is installed on an electric vehicle, the state before use can be understood as the state of a new vehicle; and the state after use should be a state after the vehicle has reached a certain mileage.

In some implementations, the thickness of the battery 100 after expansion is a thickness measured when the capacity of the battery 100 decreases to 80% or less of the initial capacity. When the capacity of the battery 100 decreases to 80% or less of the initial capacity, the battery 100 is at the end of its service life. At this moment, the charging capacity of the battery is the weakest, especially the expansion force has the greatest impact. When the thickness measured when the capacity of the battery 100 decreases to 80% or less of the initial capacity meets the above relational expression, the normal operation of the battery 100 during the full life cycle can be ensured. Therefore, in this application, the thickness of the battery 100 after expansion may be a thickness measured when the capacity of the battery 100 decreases to 80% or less of the initial capacity.

The initial capacity refers to the capacity of the battery 100 before use. "Before use" is as explained above, and will not be repeatedly described herein.

In some implementations of this application, the casing 101 includes a casing body 1012 having an opening and a cover plate 1011, the cover plate 1011 is connected to the opening of the casing body 1012 to jointly define a sealed accommodating cavity, and the core 102 is located inside the accommodating cavity.

The casing body 1012 may have an opening at only one end thereof, and correspondingly there is only one cover plate 1011; or the casing body 1012 may have an opening at each of two ends thereof, and correspondingly there are two cover plates 1011.

In the above implementation, due to its high strength, the cover plate 1011 is less likely to expand than the casing body 1012. Even if a chemical reaction occurs inside the battery 100 after a period of operation, the expansion of the cover plate 1011 can be ignored. Therefore, the initial thickness of the battery 100 before expansion, i.e., the initial thickness of the battery 100 before use can be approximately equal to the dimension of the cover plate 1011 along the first direction. In other words, the dimension of the cover plate 1011 along the thickness direction of the battery 100 is approximately equal to the thickness of the battery 100.

After the battery 100 is used for a period of time, the two opposite surfaces of the battery 100 in the thickness direction expand significantly. The closer to the center of the surface, the more significantly the battery 100 expands. At this moment, the thicknesses at different points on the battery 100 are not the same. In practice, to measure the thickness of the battery 100 after expansion, the following two measurement methods can be used:

Method 1: Calculate an average thickness of the battery 100, where n points on the casing body 1012 of the battery 100 are randomly selected according to a certain interval, thicknesses at the n points are respectively measured and recorded as d1, d2, d3, . . . dn, and the thickness of the battery 100 after expansion is d=(d1+d2+d3+ . . . dn)/n. In this method, the larger the value of n is, the more uniform the distribution of n points, and the smaller the error of the calculation result. In this implementation, n≥5.

Method 2: The thickness of the battery 100 after expansion can be understood as a spacing between two imaginary parallel planes sandwiching the battery 100 along the first direction. In other words, a maximum distance between two opposite surfaces of the battery 100 in the thickness direction, i.e, the thickness at the position with the most significant expansion of the battery 100, is measured, which is approximately equal to the thickness of the battery 100 after expansion. In an actual test, two plates having flat surfaces may be used to clamp the two surfaces of the battery 100 in the first direction respectively, the two plates are kept parallel to each other, and the distance between the two plates is recorded as the thickness of the battery 100 after expansion.

"Clamp" should be understood as that the plate just comes into contact with the surface of the casing body 1012 of the battery 100 and the plate does not exert any force on the casing body 1012, that is to say, the plate and the casing body 1012 do not compress each other.

The above two methods are for reference only. This application does not limit the method of testing the thickness of the battery 100 after expansion. In practical applications, other testing methods shall also fall within the scope of protection of this application as long as the thickness of the battery 100 after expansion measured using such methods satisfies the above relational expression.

In the above solution, the thickness of the core 102 before compression is the initial thickness of the core 102 before use. The "initial thickness of the core 102 before use" can be understood as a thickness of an electrode assembly, which is formed by successively stacking or winding a positive electrode, a separator and a negative electrode, in the first direction before being inserted into the casing 101 of the battery 100. After the core 102 is installed in the casing 101, the core 102 inside the casing 101 gradually expands after the battery 100 is used for a period of time. The initial thickness of the core 102 is not easy to measure. In order to facilitate the calculation of the compression rate of the core 102, the following two methods can be used to approximately calculate the initial thickness of the core 102:

Method 1: Initial thickness of the core 102=initial thickness of the battery 100 before use−2×thickness of the casing 101.

The core 102 may not be in close contact with the inner surface of the casing 101 after the core 102 is initially installed in the casing 101, there is a gap between the core 102 and the inner surface of the casing 101. However, in order to increase the capacity of the battery 100, the gap is generally very small and can be ignored. Therefore, the error of the initial thickness of the core 102 calculated by Method 1 is relatively small.

In this method, the initial thickness of the battery 100 before use can be as explained above, and will not be repeated herein.

Method 2: The compression rate of the core 102 is approximately calculated by using the initial thickness of the battery 100 to replace the initial thickness of the core 102.

$$compression\ rate\ b\ of\ the\ core\ 102=(initial\ thickness\\ of\ the\ battery\ 100\ before\ use-thickness\ of\ the\\ core\ 102\ after\ compression)/initial\ thickness\ of\\ the\ battery\ 100\ before\ use×100\%.$$

Before the battery 100 after assembly is shipped from the factory, the gap between the core 102 in the casing 101 and the casing 101 is generally small, and the thickness of the casing 101 is also small, so the initial thickness of the core 102 can be approximately equal to the initial thickness of the battery 100. In order to facilitate the calculation, in the formula for calculating the compression rate of the core 102, the compression rate of the core 102 can be approximately calculated by using the initial thickness of the battery 100 before use to replace the initial thickness of the core 102.

The thickness of the core 102 after compression is an average distance between two opposite surfaces of the core along the first direction after compression. For the method of measuring the average distance, reference can be made to the above Method 1 of measuring the thickness of the battery after expansion, and the details will not be repeatedly described herein.

The above two methods are for reference only. This application does not limit the methods of measuring the initial thickness of the core 102 and the thickness of the core after compression. In practical applications, other testing methods shall also fall within the scope of protection of this application as long as the initial thickness of the core 102 obtained using such methods satisfies the above relational expression.

In some implementations of this application, b represents a critical compression rate of the core 102 in the thickness direction, and the thickness of the core 102 after compression is a critical thickness of the core 102 before being damaged by compression. The critical thickness may be measured at any time during the service life of the battery 100 by compressing the core 102 to the greatest extent. That is, $$critical\ compression\ rate\ b\ of\ the\ core\ in\ the\ thick-\\ness\ direction=(thickness\ of\ the\ core\ before\\ compression-critical\ thickness\ of\ the\ core)/\\thickness\ of\ the\ core\ before\ compression×\\100\%.$$

A state in which the core 102 is about to be damaged by compression is a critical state of the core 102. It can be understood that after the core 102 is compressed to this critical state, the capacity of the battery 100 decreases at a faster rate.

The setting of the gap between neighboring batteries 100 requires fully considering the possible compression of the core 102 caused by the expansion of the battery 100 during use of the battery 100. The critical compression rate of the core 102 indicates that the core 102 can properly withstand a certain degree of compression. Before the critical compression rate of the core 102 is reached, even if two neighboring batteries 100 compress each other, the performance of the battery 100 will not be degraded. Once the core 102 is compressed to the critical thickness, the core 102 cannot be further compressed; otherwise, the core 102 will be severely damaged, the performance of the battery 100 will deteriorate, and the service life of the battery 100 will be shortened.

In view of this, it is only necessary to reserve the gap between the batteries 100 in such a manner that the compression rate of the core 102 does not exceed the critical compression rate of the core 102. Thereby, the gap between the batteries 100 can be reasonably designed.

In the core 102, the active material layer on the positive electrode plate or the negative electrode plate expands or shrinks during charging and discharging, which sometimes gives rise to the peeling or falling of the active material from the active material layer, resulting in an internal short circuit. In addition, the expansion and shrinkage of the above active material layer also breaks the close contact between the positive electrode plate, the negative electrode plate and the separator, affects the mass transfer of lithium ions, increases the internal resistance of the battery 100, and degrades the cycle performance of the battery 100. Therefore, in order to prevent the expansion and shrinkage of the active material layer, compressing the battery 100 a certain degree can prevent further expansion of the active material layer, which ensures that the positive electrode plate, the negative electrode plate and the separator are still closely attached in the case of expansion and does not affect the lithium ion mass transfer capacity, thereby improving the cycle performance of the battery 100.

Therefore, the gap between neighboring batteries 100 should not be as large as possible. A too large gap is not only detrimental to the improvement of the energy density of the battery pack 200, but also causes the cycle performance of the battery 100 to further deteriorate. It is obvious that the proper consideration of mutual compression between neighboring batteries 100 in the process of setting the gap between neighboring batteries 100 is beneficial to the cycle performance of the battery 100.

The thickness of the battery 100 after effective compression is a thickness measured after the battery 100 is compressed on the premise of improving the performance of the battery 100.

The thickness of the battery 100 after effective compression is greater than the critical thickness of the core 102 after compression. This is because there are certain gaps between the electrode plates and the separator of the battery 100. Such gaps increase the resistance to lithium ion transport in the battery 100. The main function of effective compression is to eliminate the gaps between the electrode plates and the separator of the battery 100 and reduce the resistance. However, as for the critical thickness, when the battery 100 is under critical compression, not only the gaps between the electrode plates and the separator of the battery 100 are eliminated, but also pores in the positive and negative electrode plates are further compressed, which further reduces the thickness of the battery 100. Therefore, the thickness of the battery 100 after effective compression is greater than the critical thickness of the core 102 after compression.

In this application, the life cycle of the battery 100 starts from the time of completion of the preparation of the battery 100 and ends at the time when the capacity of the battery 100 decreases to 80% of the initial capacity.

The completion of the preparation of the battery 100 means that the battery 100 is waiting to leave the factory after the assembly is completed or has left the factory but has not yet begun to provide power to the outside.

In other words, the compression rate of the core 102 may be measured before the battery 100 is used or after the battery 100 is used.

The thickness of the core 102 after compression can be measured with reference to the above method of testing the thickness of the battery 100 after expansion.

In some implementations of this application, the thickness of the core 102 after compression is a thickness of the core 102 measured after a pressure $P_1$ has been applied to the core 102 for a predetermined time.

In some implementations of this application, the pressure $P_1$ is applied to an outer surface of the core 102 along the first direction, $P_1$=0.5 Mpa-0.7 MPa, and the predetermined time $T_1$=60 s-180 s. The thickness direction of the core 102 is parallel to the first direction.

In some implementations of this application, a method of measuring the compression rate of the core 102 includes the following steps:

S1. Obtain an initial thickness $b_0$ of the core 102 before use. The initial thickness is recorded as the thickness of the core 102 before compression.

S2. Apply a pressure $P_1$ to the core 102 in step S1, and after a predetermined time $t_1$, obtain a thickness $b_1$ of the core 102:

$$b_1 = (b_0 - b_1)/b_0 \times 100\%.$$

In step S1, the thickness $b_0$ of the core 102 before use can be obtained by the above two methods, which will not be repeatedly described herein.

In step S2, the core 102 may be removed from the casing 101 at any time during the life cycle of the battery 100, and a certain pressure is applied to the surface of the core 102.

Once the battery 100 expands, the two surfaces of the core 102 in the thickness direction are compressed the most due to the restriction by the casing 101, and the two surfaces of the core 102 in the thickness direction have a relatively large surface area and can better withstand the compression. Therefore, in step S2, in some implementations, the pressure is applied along the thickness direction of the core 102. In this implementation, the pressure is $P_1$=0.5 Mpa-0.7 MPa, and the predetermined time $T_1$=60 s-180 s. The pressure and the compression time within such ranges can ensure that the core 102 can be compressed to the greatest extent without degrading the performance.

In this application, the parameter t characterizes the compression that is effective for the performance of the battery 100. In actual production, a specific compressed thickness (that is, thickness after effective compression) effective for the performance of the battery 100 can be determined by those skilled in the art according to the actual production situation. For example, the thickness after effective compression may be calculated by measuring a charge transfer resistance (Rct) from AC impedance.

In some implementations, the thickness of the battery 100 before compression is a thickness measured when a DC internal resistance of the battery 100 is $r_1$ before compression, and the thickness of the battery 100 after effective compression is a thickness measured when a pressure $P_2$ is applied to the battery 100 and the DC internal resistance of the battery 100 is $r_2$, where $r_1$ and $r_2$ satisfy: $(r_1 - r_2)/r_1 \times 100\% = 2\%-8\%$.

In a specific implementation of this application, in order to make the measurement easier, the DC internal resistance of the battery 100 may be used to determine the thickness of the battery 100 after effective compression.

In some implementations, the method of measuring the parameter t includes the following steps:

S1. Obtain a thickness to and a DC internal resistance $r_1$ of the battery 100 before compression.

S2. Apply a pressure $P_2$ to the battery 100 in step S1, and obtain a thickness $t_1$ of the battery 100 after compression when the DC internal resistance of the battery 100 is $r_2$, where $t_1$ is the thickness of the battery 100 after effective compression, where $r_1$ and $r_2$ satisfy: $(r_1 - r_2)/r_1 \times 100\% = 2\%-8\%$.

Therefore, a formula for calculating t is: $t = (t_0 - t_1)/t_0 \times 100\%$.

In the above test method, the thickness to of the battery 100 before compression may be a thickness at any time during the life cycle of the battery 100, and the thickness $t_1$ of the battery 100 after compression may also be a thickness after compression at any time during the life cycle of the battery 100.

In step S2, the value of the pressure $P_2$ is not limited, as long as $(r_1-r_2)/r_1 \times 100\% = 2\%-8\%$ is satisfied. After the battery 100 undergoes effective compression, the gaps between the electrode plates and the separator in the core 102, and the internal resistance $r_2$ of the battery 100 decreases, which facilitates the transmission of lithium ions, thereby improving the performance of the battery 100.

In some implementations, the thickness of the battery 100 before compression is a thickness measured before compression of the battery 100 when the battery 100 is at a state of charge (SOC) of 20%-80%; and the thickness of the battery 100 after effective compression is a thickness measured after compression of the battery 100 when the battery 100 is at a state of charge (SOC) of 20%-80%. When the battery 100 is at a SOC of 20%-80%, the DC internal resistance of the battery 100 can be measured accurately, so that the compression amount beneficial to the performance of the battery 100 can be quantitatively analyzed more accurately.

In some implementations, the pressure is applied along the thickness direction of the battery 100, and the pressure is applied for a time $T_2=60$ s-180 s.

According to the battery pack 200 provided by this application, the casing 101 includes a casing body 1012 having an opening and a cover plate 1011, the cover plate 1011 is connected to the openings at two ends of the casing body 1012 respectively to jointly define a sealed accommodating cavity, and the core 102 is located inside the accommodating cavity.

The gap between two neighboring batteries 100 includes a first gap, the first gap is a minimum distance between two cover plates 1011, which are located on the same side, of the two neighboring batteries 100, and the thickness of the battery 100 is a dimension of the cover plate 1011 along the first direction.

In the above implementation, due to its high strength, the cover plate 1011 is less likely to expand than the casing body 1012. Even if a chemical reaction occurs inside the battery 100 after a period of operation, the battery 100 expands to compress the neighboring battery 100, and the first gap changes (for example, gradually increases), the change is small and can be ignored, or even after the change, the ratio of the first gap to the thickness of the battery 100 still satisfies the above relational expression.

In the above implementation, two ends of the casing body 1012 are each provided with a cover plate 1011. When the batteries 100 are arranged to form a battery sequence 201 along the thickness direction, the gap between two batteries 100 refers to a minimum spacing between two cover plates 1011 at the same end of the battery sequence 201, rather than a spacing between two cover plates 1011 at different ends of the batteries 100.

In some implementations of this application, the battery 100 has two opposite first surfaces along the first direction; the gap between two neighboring batteries 100 includes a second gap, and the second gap is a minimum spacing between two first surfaces, which are opposite to each other, of the casings 101 of the two neighboring batteries 100; and the thickness of the battery 100 is a dimension of the cover plate 1011 along the first direction.

In some implementations of this application, the second gap of the battery 100 before use is greater than the second gap of the battery 100 after use.

"Before use" can be understood as that the battery 100 is waiting to leave the factory after the assembly is completed or has left the factory but has not yet begun to provide power to the outside. "After use" can be understood as that the battery 100 has provided power to the outside. For example, if the batteries 100 are assembled into a battery pack 200 and installed on an electric vehicle, the state before use can be understood as the state of a new vehicle; and the state after use should be a state after the vehicle has reached a certain mileage.

In this implementation, the second gap refers to a minimum spacing between two first surfaces, which are opposite to each other, of the two neighboring batteries 100. The spacing gradually decreases with the increase of the use time of the battery 100, mainly because the spacing between two neighboring large surfaces gradually decrease after expansion of the battery 100.

According to the battery pack 200 provided by this application, a has a value in the range of 5.8%-17.5%.

b has a value in the range of 3.21%-8.8%. When b<3.21%, the compressibility of the battery core is low, and the cycle performance of the battery core is likely to decrease due to the expansion force. When b>8.8%, the compression amount of the battery core is too large, indicating that the gap in the original core 102 is too large, and the capacity attenuation is also likely to aggravate, accompanied by gas production.

t has a value in the range of 81%-97%. When t<81%, it indicates that there are a large number of gaps in the core 102 of the battery, and the compression amount effective for the battery 100 is large. When t>97%, it indicates that there is little excess gap inside the core 102 of the battery, and the compression amount effective for the battery 100 is small.

According to the battery pack 200 provided by this application, the length of the battery 100 extends along the second direction. The length of the battery 100 is 400-2500 mm. In some embodiments of this application, the length of the battery 100 is 600-1000 mm. In some embodiments of this application, the length of the battery 100 is 1000 mm-2000 mm. In some embodiments of this application, the length of the battery 100 is 1300 mm-2200 mm.

This application is more suitable for a battery 100 with a length greater than 400 mm. Once the battery 100 expands and causes the casings 101 of two neighboring batteries 100 to come into contact, the contact part exerts a force on the battery 100 toward the core 102. The longer the battery 100 is, the longer the contact part between neighboring batteries 100 will be, as compared with short batteries 100 in the market. This is likely to give rise to uneven distribution of compression force toward the inner electrode plates in different areas of the battery 100 in the length direction. The uneven force distribution easily leads to lithium plating of the battery 100, leading to safety issues or sharp drop of the capacity of the battery 100.

In some implementations of this application, a plurality of cores 102 are packaged in the casing 101, the plurality of cores 102 are divided into several core groups, and the core groups are connected in series.

In other words, a plurality of core groups are connected in series in the casing 101, and each core group includes at least one core 102. Compared with an existing method where only one core 102 is disposed, a battery 100 with a longer length can be manufactured more conveniently by arranging a plurality of core groups in the battery 100. Under normal circumstances, once the battery 100 is long, the length of the copper and aluminum foils used as the current collector increases accordingly, which greatly increases the internal resistance of the battery 100 and cannot meet the increasing higher requirements on power and fast charging.

When the batteries 100 have the same length, this embodiment, by disposing a plurality of core groups inside the casing 101, can also greatly reduce the internal resistance of the battery 100 to avoid problems caused by overheating of the battery 100 due to high power output, fast charging, etc. Meanwhile, the capacity of the battery 100 can be increased, and the manufacturing costs of the battery 100 can be reduced.

In some implementations of this application, a packaging film is further disposed between the casing 101 and the core 102, and the core 102 is packaged in the packaging film.

In other words, the core 102 is packaged in the packaging film first, and then the casing 101 is sleeved over the packaging film, thereby achieving secondary packaging of the core 102 and improving the sealing performance of the battery 100. It can be understood that an electrolyte is further injected into the packaging film. Therefore, by means of the above method, contact between the electrolyte and the casing 101 can also be avoided, so as to prevent corrosion of the casing 101 or decomposition of the electrolyte.

In the above solution, the packaging film can be integrally arranged, a plurality of cores 102 are packaged in the same packaging film, the cores 102 are divided into several core groups, and each core group includes at least one core 102. A plurality of cores 102 in the same core group are connected in parallel, and the core groups are connected in series, thereby increasing the capacity of the battery 100 and reducing the manufacturing costs.

There may be a plurality of packaging films. The core group includes at least one core 102, each packaging film packages one core group to form a core 102 assembly, and the core 102 assemblies are connected in series.

In other words, the packaging films of the plurality of core groups are independent of each other, the number of packaging films corresponds one-to-one to the number of core groups, and each core group is separately packaged in one packaging film. In this implementation, after completion of the preparation of the plurality of core groups, one packaging film may be sleeved over each core group, and then the core 102 assemblies are connected in series.

In some embodiments, the material of the packaging film may include polypropylene (PP), polyethylene (PE) or a multilayer composite film.

For example, when the packaging film is a multilayer composite film, the packaging film may include a non-metal outer layer film and a non-metal inner layer film laminated together. The inner layer film is wrapped around an outer periphery of the core 102, and the outer layer film is wrapped on the non-metal inner layer film, that is, the inner layer film is located between the outer layer film and the core 102.

The inner layer film has good chemical stability, and for example, may be made of a material resistant to electrolyte corrosion, for example, one or a combination of more than one of polypropylene (PP), polyethylene (PE) or polyethylene terephthalate (PET).

The outer layer film is a protective layer. The outer layer film can prevent the penetration of air, especially water vapor, oxygen, etc., and may be made of a material such as one or a combination of more than one of polyethylene terephthalate, polyamide or polypropylene.

In the embodiments of this application, the melting point of the outer layer film is greater than the melting point of the inner layer film, so that the outer layer film will not melt during hot-melt sealing, and the inner film can melt in time to ensure excellent sealing performance. In some embodiments of this application, the difference between the melting points of the outer layer film and the inner layer film may be 30-80° C., for example, 50° C. or 70° C. The specific material of the outer layer film and the inner layer film can be selected according to actual needs.

In the embodiments of this application, the non-metal outer layer film and the non-metal inner layer film are bonded with an adhesive. The adhesive can be specifically selected according to the properties of the non-metal outer layer film and the non-metal inner layer film. For example, a PP film and a PET film which are not quite compatible and are likely to delaminate are bonded with a polyolefin adhesive to form a composite film.

In some other implementations, the packaging film may be an aluminum-plastic composite film.

In this application, the battery 100 may be a pouch cell, and correspondingly, the casing 101 may be an aluminum-plastic film. Alternatively, the battery may also be a hard-case cell, and correspondingly, the casing 101 is a metal casing. The metal casing includes but is not limited to an aluminum casing or a steel casing.

Figures 3, 4, 5:
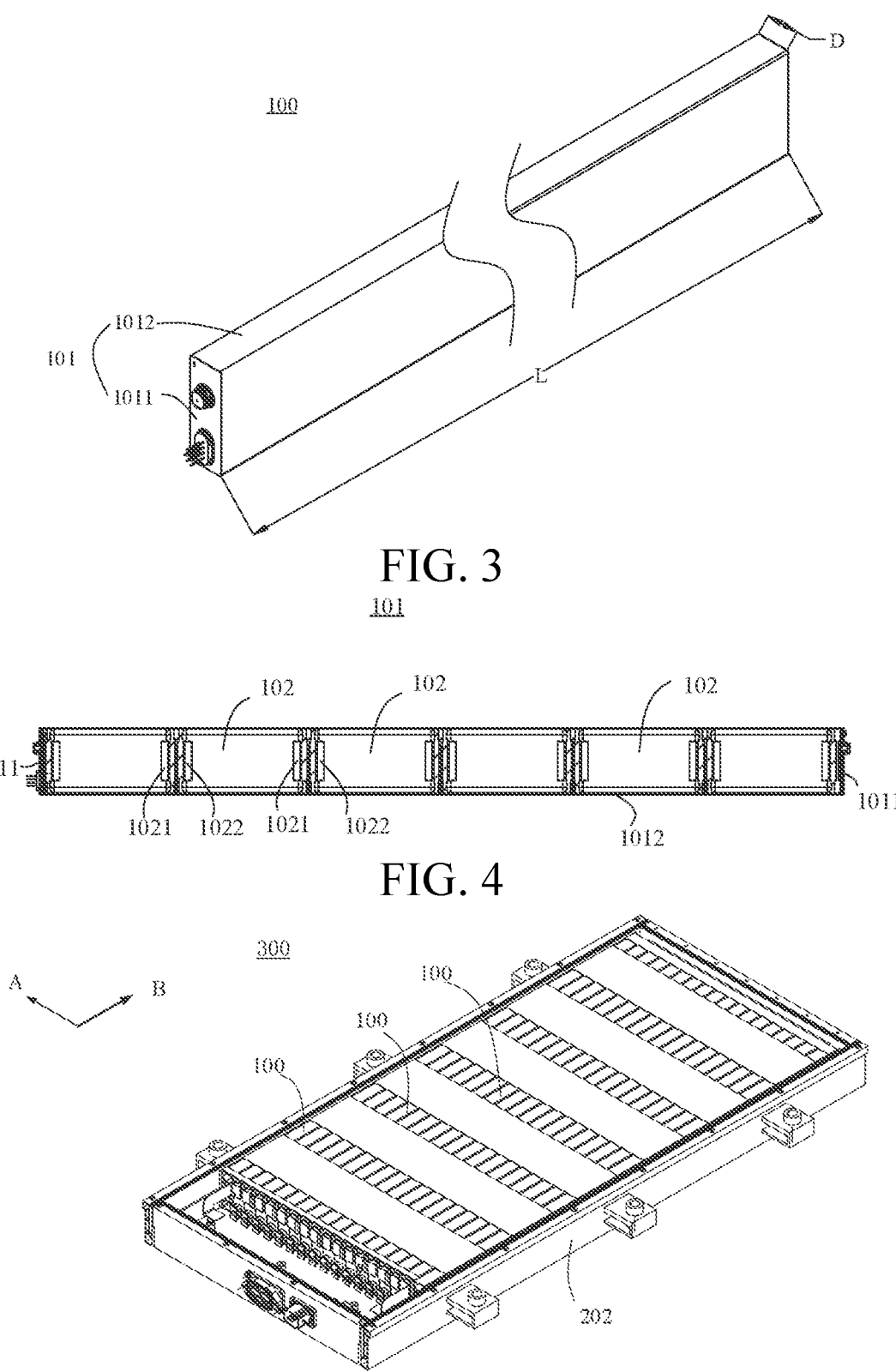
FIG. 3 is a schematic diagram of a battery according to this application.
FIG. 4 is a cross-sectional view of a battery pack according to this application.
FIG. 5 is a schematic diagram of a battery module according to this application.

Referring to FIG. 5 and FIG. 2, according to a second aspect of this application, a battery module 300 is provided, including at least one battery sequence 201, where the battery sequence 201 includes a plurality of batteries 100; a thickness of each battery 100 extends along a first direction, and the plurality of batteries 100 are successively arranged along the first direction to form the battery sequence 201; and at least one of the batteries 100 includes a casing 101 and a core 102 packaged in the casing 101, a gap exists between at least two neighboring batteries 100, a ratio of the gap to the thickness of the battery 100 is c, and c satisfies the following relational expression: $(a-b)<c<(a\times t)$, where a represents an expansion rate of the battery 100;

b represents a compression rate of the core 102; and t represents a ratio in percentage of a thickness of the battery 100 after effective compression to a thickness of the battery 100 before compression.

In some implementations of this application, a represents an expansion rate of the battery 100 in the first direction, and b represents a compression rate of the core 102 in the first direction.

In some implementations, a=(thickness of the battery 100 after expansion−thickness of the battery 100 before expansion)/thickness of the battery 100 before expansion×100%;

b=(thickness of the core 102 before compression−thickness of the core 102 after compression)/thickness of the core 102 before compression×100%;

and t=thickness of the battery 100 after effective compression/thickness of the battery 100 before compression×100%.

In some implementations of this application, the thickness of the battery 100 before expansion is an initial thickness of the battery 100 before use, and the thickness of the battery 100 after expansion is a thickness measured when a capacity of the battery 100 decreases to 80% or less of an initial capacity.

In some implementations of this application, the casing 101 includes a casing body 1012 having an opening and a cover plate 1011, the cover plate 1011 is connected to the opening of the casing body 1012 to jointly define a sealed accommodating cavity, and the core 102 is located inside the accommodating cavity;

the thickness of the battery 100 before expansion is a dimension of the cover plate 1011 along the first direction;

and the thickness of the battery 100 after expansion is a minimum value of a spacing between two imaginary parallel planes sandwiching the battery 100 along the first direction.

In some implementations of this application, b represents a critical compression rate of the core 102 in the first direction, and the thickness of the core 102 after compression is a critical thickness of the core 102 before being damaged by compression.

In some implementations of this application, the thickness of the battery 100 after effective compression is greater than the critical thickness of the core 102 after compression.

In some implementations of this application, the thickness of the core 102 before compression is an initial thickness of the core 102 before use; and the thickness of the core 102 after compression is an average distance between two opposite surfaces of the core 102 along the first direction after compression.

In some implementations of this application, the thickness of the core 102 after compression is a thickness of the core 102 measured after a pressure $P_1$ has been applied to the core 102 for a predetermined time.

In some implementations of this application, the pressure is applied to an outer surface of the core 102 along the first direction, $P_1=0.5$ Mpa-0.7 MPa, and the predetermined time $T_1=60$ s-180 s.

In some implementations of this application, a=(thickness of the battery after expansion−thickness of the battery before expansion)/thickness of the battery before expansion×100%, b=(initial thickness of the battery before use−thickness of the core after compression)/initial thickness of the battery before use×100%, and t=thickness of the battery after effective compression/thickness of the battery before compression×100%.

In some implementations of this application, the thickness of the battery 100 before compression is a thickness measured when a DC internal resistance of the battery 100 is $r_1$ before compression, and the thickness of the battery 100 after effective compression is a thickness measured when a pressure $P_2$ is applied to the battery 100 and the DC internal resistance of the battery 100 is $r_2$, where $r_1$ and $r_2$ satisfy: $(r_1-r_2)/r_1 \times 100\% = 2\%-8\%$.

In some implementations of this application, the pressure $P_2$ is applied to an outer surface of the battery 100 along the first direction.

In some implementations of this application, the thickness of the battery 100 before compression is a thickness measured before compression when the battery 100 is at a state of charge (SOC) of 20%-80%; and the thickness of the battery 100 after effective compression is a thickness measured after compression when the battery 100 is at a state of charge (SOC) of 20%-80%.

In some implementations of this application, the gap between two neighboring batteries 100 is a gap between the two neighboring batteries 100 before use; and the thickness of the battery 100 is an initial thickness of the battery 100 before use.

In some implementations of this application, the casing 101 includes a casing body 1012 having an opening and a cover plate 1011, the cover plate 1011 is connected to the opening of the casing body 1012 to jointly define a sealed accommodating cavity, and the core 102 is located inside the accommodating cavity;

and the gap between two neighboring batteries 100 includes a first gap, the first gap is a minimum distance between two cover plates 1011, which are located on the same side, of the two neighboring batteries 100, and the thickness of the battery 100 is a dimension of the cover plate 1011 along the first direction.

In some implementations of this application, the battery 100 has two opposite first surfaces along the first direction; the gap between two neighboring batteries 100 includes a second gap, and the second gap is a minimum spacing between two first surfaces, which are opposite to each other, of the casings 101 of the two neighboring batteries 100; and the thickness of the battery 100 is a dimension of the cover plate 1011 along the first direction.

In some implementations of this application, the second gap of the battery 100 before use is greater than the second gap of the battery 100 after use.

In some implementations of this application, a has a value in the range of 5.8%-17.5%, b has a value in the range of 3.21%-8.8%, and t has a value in the range of 81%-97%.

In some implementations of this application, a length of the battery 100 extends along the second direction, and the length of the battery 100 is 400-2500 mm; and the second direction is different from the first direction.

In some implementations of this application, a plurality of cores 102 are packaged in the casing 101, the plurality of cores 102 are divided into several core groups, and the core groups are connected in series.

In some implementations of this application, a packaging film is further disposed between the casing 101 and the core 102, and the core 102 is packaged in the packaging film.

The battery 100 module provided by this application has a long service life and high safety performance.

Figure 6:
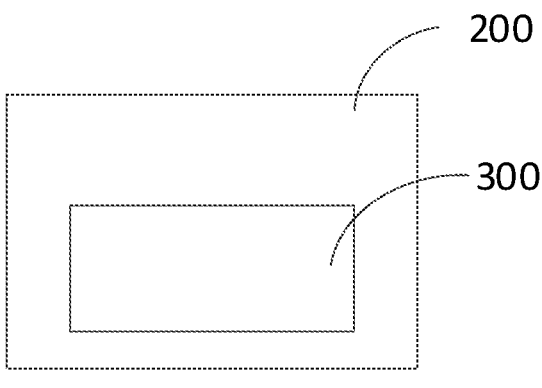
FIG. 6 is a block diagram of a battery pack according to this application.

Referring to FIG. 6, according to a third aspect of this application, a battery pack 200 is provided, including the above battery module. The battery pack 200 provided by this application has a long service life, high safety performance and high space utilization.

Figure 7:
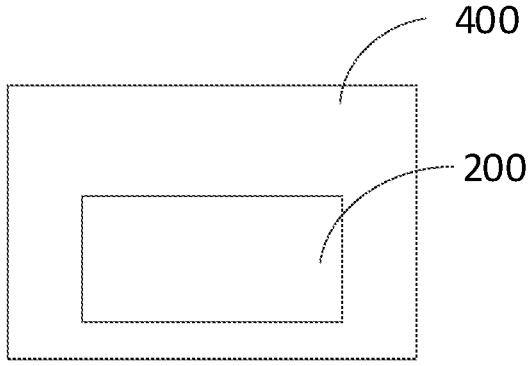
FIG. 7 is a block diagram of a vehicle according to this application.

Referring to FIG. 7, according to a fourth aspect of this application, a vehicle 400 is provided, including the above battery pack 200.

Figure 8:
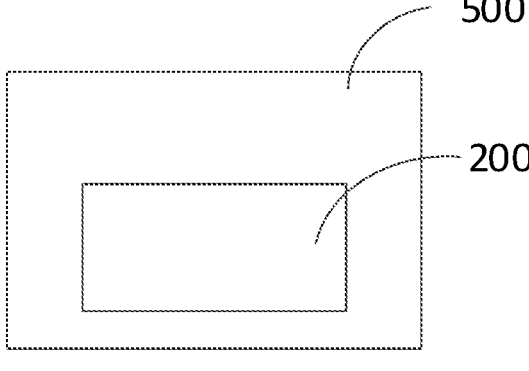
FIG. 8 is a block diagram of an energy storage device according to this application.

Referring to FIG. 8, according to a fifth aspect of this application, an energy storage device 500 is provided, including the above battery pack 200.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the terms in this application according to specific situations.

In description of this specification, description of reference terms such as "an embodiment", "specific embodiments", or "an example", means including specific features, structures, materials, or features described in the embodiment or example in at least one embodiment or example of this application. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of this application have been shown and described, persons of ordinary skill in the art should understand that various changes, modifications, replacements and variations may be made to the embodiments without departing from the principles and spirit of this application, and the scope of this application is as defined by the appended claims and their equivalents.

This application will be further described below in conjunction with specific embodiments. It should be understood that the cited embodiments are only used to illustrate this application and not to limit the scope of this application.

Example 1

As shown in FIG. 1 to FIG. 4 a battery pack 200 includes a tray 202 and a battery sequence 201 located in the tray. The battery sequence 201 includes a plurality of batteries 100. A thickness of each battery 100 extends along a first direction A, and a length of each battery 100 extends along a second direction B. The plurality of batteries 100 are successively arranged along the first direction A to form the battery sequence 201. A gap S is provided between two neighboring batteries.

Each battery 100 includes a casing (aluminum casing) 101. The aluminum casing 101 includes a casing body 1012 having an opening at each of two ends thereof and two cover plates 1011. The cover plates 1011 are connected to the openings of the casing body 1012 to jointly define a sealed accommodating cavity, and the core 102 is located inside the accommodating cavity. There are a plurality of cores 102. Each core is packaged in a packaging film (not shown). Each core includes a positive tab 1021 and a negative tab 1022 for leading out a current. Along the length direction of the core, the positive tab 1021 and the negative tab 1022 are respectively arranged at two opposite ends of the core. The plurality of cores 102 are successively arranged along the length direction of the battery to form a core sequence. The positive tab 1021 of one core 102 of the two neighboring cores 102 is electrically connected to the negative tab of the other core 102, so that the plurality of cores 102 are connected in series.

1. Measurement Method of Related Parameters of Battery
(1) Measure the Expansion Rate a of the Battery After the battery pack has been working for a period of time, the dimension of the cover plate 1011 of the battery 100 along the first direction A (the thickness direction of the battery) is measured and recorded as an initial thickness D of the battery before expansion, and a distance between two imaginary parallel planes sandwiching the battery along the thickness direction of the battery is measured (refer to Method 2 of measuring the thickness of the battery after expansion as described in the specification) and recorded as a thickness d1 of the battery after expansion. The expansion rate a of the battery=$(d1-D)/D \times 100\%$.

(2) Measure the Compression Rate b of Core

The core is removed from the aluminum casing. The thickness of the core before compression is replaced by the initial thickness D of the battery before expansion. The core is placed in a universal compression tester. A pressure of 0.7 Ma is applied to the core along the first direction A (the thickness direction of the core). Then a distance between two imaginary parallel planes sandwiching the core along the thickness direction of the battery is measured (refer to Method 2 of measuring the thickness of the battery after expansion as described in the specification) and recorded as a thickness b1 after compression. The compression rate of the core=$(D-b1)/D \times 100\%$.

(3) Measure t

A thickness t0 of the battery when the battery is at a SOC of 80% is measured (refer to Method 2 of measuring the thickness of the battery after expansion as described in the specification). Then the battery is charged with 1 C current for 30 s, and a DC internal resistance (DCIR) of the battery is measured, where DCIR=(voltage V1 before charging–highest voltage V2 at the end of charging)/current. Then the battery is placed in a universal compression tester. A pressure is applied to the battery along the thickness direction of the battery. The DCIR of the battery is always measured by the above method (where the battery is charged with 1 C current for 30 s, and DCIR=(voltage V1 before charging–highest voltage V2 at the end of charging)/current), until the DCIR of the battery drops by 5%. A thickness t1 of the battery at this moment is measured. The effective compression rate of the battery is t=t1/t0.

2. Cycle Performance Test of the Battery Pack

At 25° C., the batteries of the examples and comparative examples were subjected to full charge and discharge cycle test at a charge rate of 0.75 C and discharge rate of 0.75 C. The decrease of the capacity of each battery in the battery pack was recorded until the capacity of a battery decreased to 80%. The number of cycles was outputted. The voltage range of the positive electrode material being lithium iron phosphate is 2.5-3.8 V, and the voltage range of the ternary battery is 3-4.2 V.

The following embodiments all take lithium iron phosphate batteries as examples.

TABLE 1

| | | | | | | | | | |
|---|---|---|---|---|---|---|---|---|---|
| Test results of examples and comparative examples | | | | | | | | | |
| | Example 1 | Example 2 | Example 3 | Example 4 | Example 5 | Example 6 | Comparative Example 1 | Comparative Example 2 | Comparative Example 3 |
| Battery capacity (Ah) | 142 | 141 | 141 | 142 | 143 | 141 | 143 | 140 | 142 |
| Battery level (Wh) | 454.4 | 451.2 | 451.2 | 454.4 | 457.6 | 451.2 | 457.6 | 454.4 | 454.4 |
| Expansion rate a of battery (%) | 12.14 | 11.81 | 11.77 | 12.35 | 12.25 | 11.93 | 12.02 | 11.98 | 11.86 |
| Compression rate b of core (%) | 3.24 | 4.01 | 3.56 | 3.41 | 3.66 | 3.87 | 3.47 | 3.59 | 3.61 |
| Gap S between two neighboring batteries (mm) | 9.35 | 8.31 | 8.97 | 9.82 | 10.03 | 10.01 | 5.08 | 6.21 | 14.58 |
| Effective compression rate t of battery (%) | 86 | 92 | 85 | 89 | 9 | 86 | 87 | 85 | 89 |
| a – b | 8.9 | 7.8 | 8.21 | 8.94 | 8.59 | 8.06 | 8.55 | 8.39 | 8.25 |
| a*t | 10.4404 | 10.8652 | 10.0045 | 10.9915 | 11.025 | 10.2598 | 10.4574 | 10.183 | 10.5554 |
| Number of cycles | 2426 | 2165 | 2287 | 2489 | 2545 | 2588 | 1223 | 1465 | 1753 |

TABLE 1-continued

| | Test results of examples and comparative examples | | | | | | | | |
|---|---|---|---|---|---|---|---|---|---|
| | Example 1 | Example 2 | Example 3 | Example 4 | Example 5 | Example 6 | Comparative Example 1 | Comparative Example 2 | Comparative Example 3 |
| (where the capacity decreases to 80%) | | | | | | | | | |

It can be seen from the experimental data in the table that when the ratio of the gap between two neighboring batteries to the thickness of the battery falls within the range defined in this application, the service life of the battery was significantly increased, and either a too large or too small gap caused a decrease in the capacity of the battery.

What is claimed is:

1. A battery pack, comprising a plurality of batteries, wherein:

a thickness of each battery extends along a first direction, the plurality of batteries are successively arranged along the first direction to form a battery sequence, each of the plurality of batteries comprises a casing and a core in the casing, a gap exists between two neighboring batteries, and a ratio of the gap to the thickness of each battery is c, and c satisfies the following relational expression: $(a-b) < c < (a \times t)$, wherein:

a represents an expansion rate of each battery;

b represents a compression rate of the core in the casing of each of the plurality of batteries; and t represents a ratio in percentage of a thickness of each battery after effective compression to a thickness of each battery before compression.

2. The battery pack according to claim 1, wherein the expansion rate of each battery is an expansion rate of each battery in the first direction, and the compression rate of the core in the casing of each of the plurality of batteries is a compression rate of the core in the casing of each of the plurality of batteries in the first direction.

3. The battery pack according to claim 2, wherein:

a=(a thickness of each battery after expansion−a thickness of each battery before expansion)/a thickness of each battery before expansion×100%, b=(a thickness of the core before compression−a thickness of the core after compression)/a thickness of the core before compression×100%, and t=a thickness of each battery after effective compression/a thickness of each battery before compression×100%.

4. The battery pack according to claim 3, wherein the thickness of each battery before expansion is an initial thickness of each battery before use, and the thickness of each battery after expansion is a thickness measured when a capacity of each battery decreases to 80% or less of an initial capacity.

5. The battery pack according to claim 3, wherein:

the casing comprises a casing body having an opening and a cover plate, the cover plate is connected to the opening of the casing body to jointly define a sealed accommodating cavity, and the core is located inside the sealed accommodating cavity;

the thickness of each battery before expansion is a dimension of the cover plate along the first direction; and the thickness of each battery after expansion is a spacing between two imaginary parallel planes sandwiching each battery along the first direction.

6. The battery pack according to claim 3, wherein the thickness of the core after compression is a critical thickness of the core before being damaged by compression, and the thickness of each battery after effective compression is greater than the critical thickness of the core after compression.

7. The battery pack according to claim 3, wherein the thickness of the core before compression is an initial thickness of the core before use; and the thickness of the core after compression is an average distance between two opposite surfaces of the core along the first direction after compression.

8. The battery pack according to claim 3, wherein the thickness of the core after compression is a thickness of the core measured after a pressure $P_1$ has been applied to the core for a predetermined time $T_1$.

9. The battery pack according to claim 8, wherein the pressure $P_1$ has been applied to an outer surface of the core along the first direction, the pressure $P_1$ is between 0.5 MPa and 0.7 MPa, and the predetermined time $T_1$ is between 60 s and 180 s.

10. The battery pack according to claim 2, wherein a=(a thickness of each battery after expansion−a thickness of each battery before expansion)/a thickness of each battery before expansion×100%, b=(an initial thickness of each battery before use−a thickness of the core after compression)/an initial thickness of each battery before use×100%, and t=a thickness of each battery after effective compression/a thickness of each battery before compression×100%.

11. The battery pack according to claim 3, wherein the thickness of each battery before compression is a thickness measured when a DC internal resistance of each battery is $r_1$ before compression, and the thickness of each battery after effective compression is a thickness measured when a pressure $P_2$ is applied to each battery and the DC internal resistance of each battery is $r_2$, wherein $(r_1-r_2)/r_1 \times 100\%$ is between 2% and 8%, and the pressure $P_2$ is applied to an outer surface of each battery along the first direction.

12. The battery pack according to claim 3, wherein the thickness of each battery before compression is a thickness measured before compression when each battery is at a state of charge (SOC) of 20%-80%; and thickness of each battery after effective compression is a thickness measured after compression when each battery is at a state of charge (SOC) of 20%-80%.

13. The battery pack according to claim 3, wherein the gap between two neighboring batteries is a gap between the two neighboring batteries before use; and the thickness of each battery is a thickness of each battery before use.

14. The battery pack according to claim 1, wherein the casing comprises a casing body having an opening and a cover plate, the cover plate is connected to the opening of the casing body to jointly define a sealed accommodating cavity, and the core is located inside the sealed accommodating cavity;

and the gap between two neighboring batteries comprises a first gap, the first gap is a minimum distance between two cover plates, which are located on the same side, of the two neighboring batteries, and the thickness of each battery is a dimension of the cover plate along the first direction.

15. The battery pack according to claim 1, wherein the casing comprises a casing body having an opening and a cover plate, the cover plate is connected to the opening of the casing body to jointly define a sealed accommodating cavity, and the core is located inside the sealed accommodating cavity;

each battery has two opposite first surfaces along the first direction;

the gap between two neighboring batteries comprises a second gap, and the second gap is a minimum spacing between two first surfaces, which are opposite to each other, of the two neighboring batteries; and the thickness of each battery is a dimension of the cover plate along the first direction.

16. The battery pack according to claim 15, wherein the second gap of the two neighboring batteries before use is greater than the second gap of the two neighboring batteries after use.

17. The battery pack according to claim 1, wherein a has a value in a range of 5.8% to 17.5%, b has a value in a range of 3.21% to 8.8%, and t has a value in a range of 81% to 97%.

18. The battery pack according claim 1, wherein a length of each battery extends along a second direction, and the length of each battery is between 400 mm and 2500 mm; and the second direction is different from the first direction.

19. A vehicle, comprising the battery pack according to claim 1.

20. A battery pack, comprising a plurality of batteries arranged in a sequence in a thickness direction of each battery, each battery including a casing and a core within the casing, wherein: two neighboring batteries have a gap, a ratio of the gap to a thickness of each battery is c, and c satisfies the following relational expression: $(a-b)<c<(a\times t)$, wherein:

a represents an expansion rate of each battery;

b represents a compression rate of the core within the casing of each battery; and t represents a ratio in percentage of a thickness of each battery after effective compression to a thickness of each battery before compression.

\* \* \* \* \*